(12) United States Patent
Rastegar et al.

(10) Patent No.: US 10,619,986 B2
(45) Date of Patent: Apr. 14, 2020

(54) LASER ACTIVATED INITIATION DEVICES WITH SELF-POWERED EVENT DETECTION AND ARMING LOGIC AND FALSE TRIGGER PROTECTION FOR MUNITIONS

(71) Applicants: Jahangir S Rastegar, Stony Brook, NY (US); Ziyuan Feng, Ronkonkoma, NY (US)

(72) Inventors: Jahangir S Rastegar, Stony Brook, NY (US); Ziyuan Feng, Ronkonkoma, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 15/659,559

(22) Filed: Jul. 25, 2017

(65) Prior Publication Data

US 2018/0031357 A1    Feb. 1, 2018

Related U.S. Application Data

(60) Provisional application No. 62/367,077, filed on Jul. 26, 2016.

(51) Int. Cl.
*F42C 15/40* (2006.01)
*F42C 15/24* (2006.01)
*H02N 2/18* (2006.01)

(52) U.S. Cl.
CPC ............ *F42C 15/40* (2013.01); *H02N 2/181* (2013.01); *F42C 15/24* (2013.01)

(58) Field of Classification Search
CPC .......... F42C 15/24; F42C 15/40; F42C 19/12; H02N 2/181
USPC ............... 102/210, 215, 221, 247, 248, 262
See application file for complete search history.

(56) References Cited

U.S. PATENT DOCUMENTS

| | | | | |
|---|---|---|---|---|
| 6,078,016 A | * | 6/2000 | Yoshikawa | G01P 15/0802 200/181 |
| 6,314,887 B1 | * | 11/2001 | Robinson | F42C 19/06 102/262 |
| 8,121,761 B2 | * | 2/2012 | Bourbiel | B60R 21/0132 280/734 |
| 8,220,329 B2 | * | 7/2012 | Lee | G01P 1/127 73/491 |
| 8,925,462 B2 | * | 1/2015 | Biggs | F42C 15/40 102/215 |
| 2018/0033949 A1 | * | 2/2018 | Rastegar | H02N 2/181 |

* cited by examiner

*Primary Examiner* — James S Bergin

(57) ABSTRACT

A laser activated initiation device including: a piezoelectric element; a capacitor; a self-powered acceleration pulse event detection with false trigger protection circuit; a switch reset circuit; and a switching circuit; wherein when the piezoelectric element is subjected to an acceleration pulse the piezoelectric element generates an open-circuit charge profile to charge the capacitor.

22 Claims, 10 Drawing Sheets

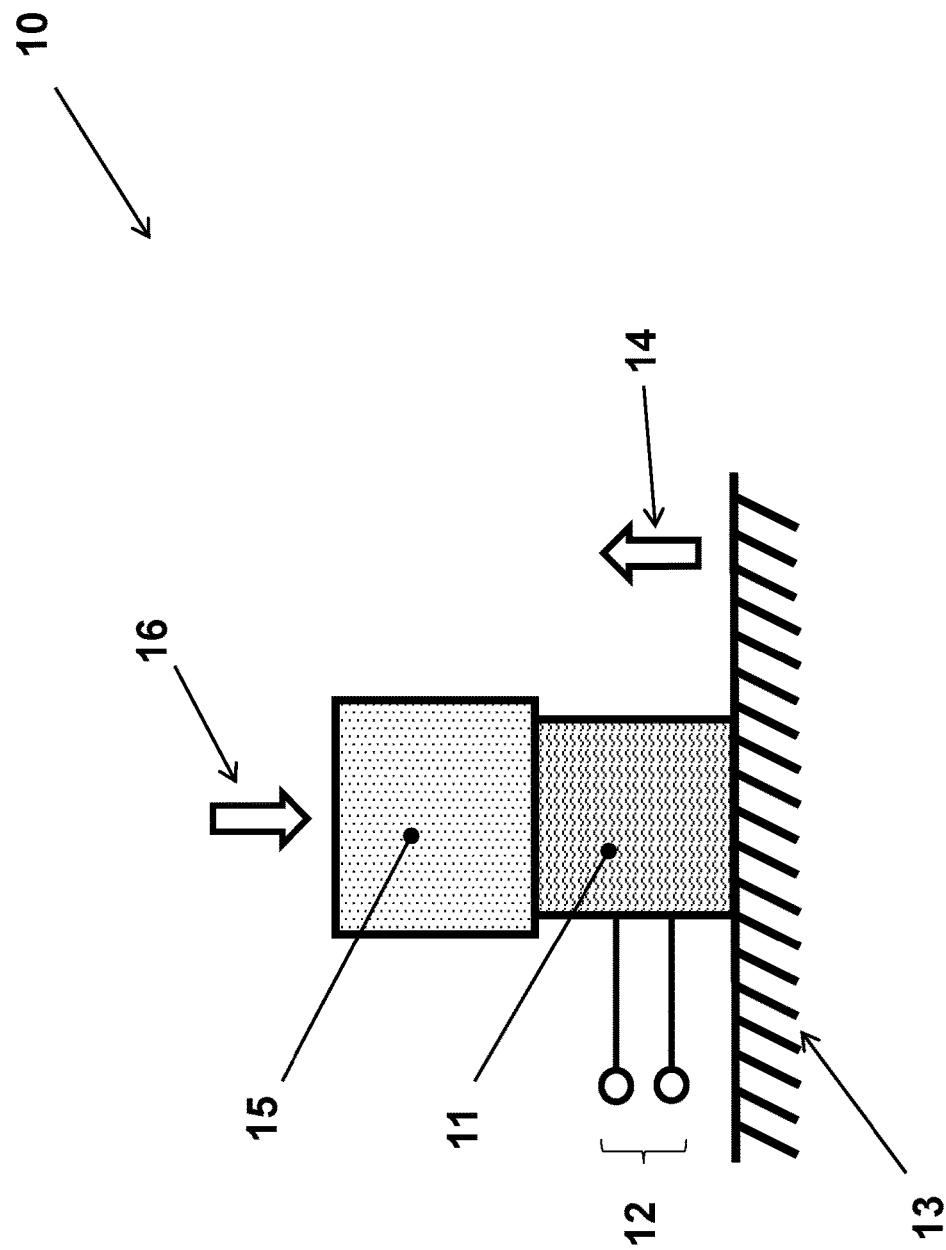

LASER ACTIVATED INITIATION DEVICES WITH SELF-POWERED EVENT DETECTION AND ARMING LOGIC AND FALSE TRIGGER PROTECTION FOR MUNITIONS

CROSS-REFERENCE TO RELATED APPLICATION

This application claims the benefit of U.S. Provisional Application No. 62/367,077 filed on Jul. 26, 2016, the entire contents of which is incorporated herein by reference.

BACKGROUND

1. Field

The present disclosure relates generally to laser activated initiation devices with piezoelectric elements based self-powered arming firing event detection from setback acceleration magnitude and duration, as indicated from a minimum acceleration magnitude and its minimum duration, with false trigger protection logic that is used for arming the initiation device, and more particularly for electrically initiating pyrotechnic materials for activating reserve batteries using laser as electrical energy and initiation triggering source at a desired time following the arming of the initiation device.

2. Prior Art

Arming circuits using G-switch or inertial switch have been used in munitions and many other devices that are desired to be similarly enabled (armed) following an acceleration pulse event due to firing setback in munitions or impact in munitions and many other similar events. A G-switch or inertial switch is a switch that can change its state, for example, from open to close, in response to acceleration and/or deceleration. Hereinafter, the term acceleration is intended to also include deceleration and the disclosed devices are readily seen by those skilled in the art that can be configured to react to either acceleration or deceleration events by their reorientation. For example, when the acceleration along a particular direction exceeds a certain threshold value, the inertial switch changes its state, and the change can then be used to trigger an electrical circuit controlled by the inertial switch. Inertial switches are employed in a wide variety of applications such as automobile airbag deployment systems, vibration alarm systems, detonators for artillery projectiles, and motion-activated light-flashing footwear. Description of several representative prior-art inertial switches can be found, for example, in U.S. Pat. Nos. 7,212,193, 6,354,712, 6,314,887, 5,955,712, 5,786,553, 4,178,492, and 4,012,613, the teachings of all of which are incorporated herein by reference.

To ensure safety and reliability, laser activated initiation devices are desired to be provided with arming (enabling) capability that is activated upon detection of certain event. The function of the arming mechanism is to ensure that the initiation device cannot activated with the intended laser beam unless the laser activated initiation device is armed. In munitions applications, the laser activated initiation devices are desired to be armed (enabled) only once the firing event, i.e., a prescribed minimum setback acceleration magnitude and duration at the minimum setback acceleration magnitude (the so-called all-fire condition in munitions), is detected. All other acceleration events, such as those with larger than the prescribed minimum setback acceleration magnitude but significantly shorter duration or significantly smaller than the prescribed minimum setback acceleration magnitude and long in duration (the so-called no-fire conditions in munitions), should not arm (enable) the laser activated initiation device. The no-fire conditions may occur during manufacture, assembly, handling, transport, accidental drops, or other similar accidental events.

The laser activated initiation devices with arming capability are particularly desirable for initiating reserve batteries such as reserve thermal batteries with a certain amount of time delay after the arming event.

In many applications, these two requirements often compete with respect to acceleration magnitude, but differ greatly in impulse. For example, an accidental drop may well cause very high acceleration levels—even in some cases higher than the firing of a shell from a gun. However, the duration of this accidental acceleration will be short, thereby subjecting the device to a significantly lower resulting impulse levels. It is also conceivable that the device will experience incidental low but long-duration accelerations, whether accidental or as part of normal handling, which must be guarded against activation. Again, the impulse given to the device will have a great disparity with that given by the intended activation acceleration profile because the magnitude of the incidental long-duration acceleration will be quite low.

The disclosed laser activated initiation devices uses an integrated circuit (IC) with a self-powered piezoelectric-based all-fire detection, i.e., detection of the prescribed minimum setback acceleration magnitude and duration at the minimum setback acceleration magnitude, with the aforementioned no-fire trigger protection. In the disclosed laser activated initiation devices, the all-fire detection is used to arm (enable) the device for initiation. The above integrated circuit (IC) and the self-powered piezoelectric-based all-fire detection with no-fire trigger protection are described in detail in U.S. Provisional Patent Application Nos. 62/367,075, Filed on Jul. 26, 2016 and 62/510,179, filed on May 23, 2017, the Disclosures of each of which are incorporated herein by reference.

The self-powered piezoelectric-based all-fire detection no-fire detection protection used for arming (enabling) of the disclosed laser activated initiation devices may provide one or more of the following advantages over prior art mechanical or MEMS-based or other types of arming (enabling) devices:

Provide self-powered and passive arming mechanisms that are not mechanical, therefore can be very small, and once armed will stay indefinitely armed without requiring external electrical power;

Eliminate the need for accelerometers and processors with their own power sources to measure the all-fire acceleration or deceleration pulses and measure their duration to determine if a prescribed acceleration pulse event (corresponding to an all-fire setback acceleration for the case of gun fired munitions and mortars and rockets) is to be considered as detected;

By only using a very few external electronic components, for example one resistor and one capacitor, the arming circuit can be programmed to arm the laser activated initiation device at any desired minimum acceleration or deceleration level and its duration, i.e., arming for any desired all-fire and no-fire condition;

Provide self-powered electronic circuits that can be mounted directly onto the electronics circuits boards or the like, thereby significantly simplifying the electrical and electronic circuitry; simplifying the assembly process and total cost; significantly reducing the occupied volume; and eliminating the need for physical wiring to and from other event detection components;

Provide laser activated initiation devices with self-powered programmable arming devices that can be hermetically sealed to simplify storage and increase their shelf life. Once armed, the laser activated initiation device can be used to initiate pyrotechnic materials by a laser beam with or without a prescribed time delay.

SUMMARY

A need therefore exists for laser activated initiation devices with self-powered programmable electronic arming (enabling) circuits that enables laser activated initiation upon detection of a prescribed acceleration pulse event with false trigger protection logic. The self-powered arming circuit must be capable of detecting acceleration pulses with a prescribed minimum amplitude that lasts longer than a prescribed time duration, such as those experienced during munitions firing or target impact or other similar events. The laser activated initiation devices preferably use the integrated circuit (IC) disclosed in the aforementioned U.S. Provisional Patent Application Nos. 62/367,075, Filed on Jul. 26, 2016 and 62/510,179, filed on May 23, 2017, and require very few discrete electronic components to "program" the arming circuit to detect a prescribed acceleration pulse and to be configured to perform the pyrotechnic initiation by the activating laser beam with or without a time delay.

Accordingly, laser activated initiation devices with self-powered programmable electronic arming (enabling) circuits that enables laser activated initiation upon detection of a prescribed acceleration pulse event with false trigger protection logic is disclosed. The arming circuit is self-powered and arms (enables) the laser activated initiation device for initiation of pyrotechnic material with a laser beam once the prescribed acceleration pulse, i.e., an acceleration pulse that is higher than a minimum magnitude and which has a duration longer than a minimum duration at or above the minimum acceleration magnitude, is detected. Such laser activated initiation devices are highly desirable for activating reserve batteries such as reserve thermal batteries following the detection of the arming event, with any desired time delay.

Also disclosed are methods of constructing laser activated initiation devices with the aforementioned piezoelectric-based self-powered arming circuit for enabling laser beam initiation of pyrotechnic materials with or without a desired delay time following arming; and electrical initiation devices using laser beam as their electrical energy source with arming capability upon detection of a prescribed acceleration pulse event (all-fire condition for the case of munitions), with false trigger protection capability.

It is appreciated by those skilled in the art that in most applications, particularly in munitions applications, it is critical that the devices such as the present laser activated initiation devices be highly reliable and be provided with false trigger protection capability. To ensure reliability and false trigger protection capability, these and the like devices must be capable of differentiating the prescribed acceleration pulse events as described by minimum acceleration pulse magnitude and duration (the so-called all-fire events for the case of gun-fired munitions and mortars) from acceleration events which may occur during manufacture, assembly, handling, transport, accidental drops, etc. In the disclosed laser activated initiation devices, the aforementioned self-powered event detection with false triggering protection capability is used for arming the laser activated initiation devices. As a result, the laser activated initiation devices are provided with a high level of safety.

BRIEF DESCRIPTION OF THE DRAWINGS

These and other features, aspects, and advantages of the apparatus will become better understood with regard to the following description, appended claims, and accompanying drawings where:

FIG. 1 illustrates a typical piezoelectric-based electrical energy generator component of a self-powered device that is intended to generate electrical energy when subjected to an acceleration pulse.

DETAILED DESCRIPTION

Figure 3:
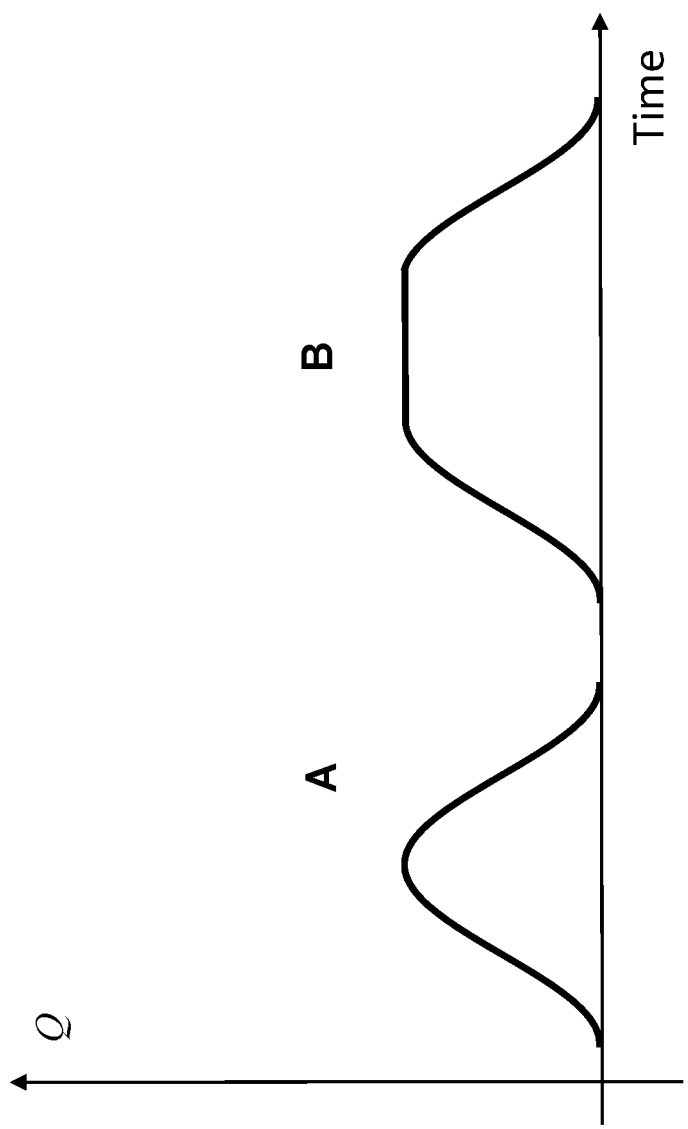
FIG. 3 illustrates plots of typical generated piezoelectric charges as a function time during a typical short duration acceleration pulse loading.

A typical piezoelectric electrical energy generator 10, usually with a stack type piezoelectric element 11, that is used in self-powered devices to generate electrical energy when the device is subjected to shock loading, for example due to the setback acceleration pulse in munitions firing, is shown in the schematic of FIG. 1. In the configuration shown in FIG. 1, the piezoelectric electrical energy (charge) generator 10 is shown as rigidly attached to a base structure 13, which is considered to be subjected at certain point in time to the acceleration pulse in the direction of the arrow 14. A relatively rigid mass 15 may also be required to react to the acceleration 14 and apply a resulting compressive force to the piezoelectric element 11. Then as a result of the compressive force and the internal normal compressive pressure generated in the piezoelectric element 11 due to its own mass as a result of the acceleration pulse, the piezoelectric element 11 is strained (deformed) axially, and thereby would generate electrical charges at its electrodes as is well known in the art. The leads 12, properly connected to the electrodes of the piezoelectric element, would make the generated charges available for collection and conditioning by an appropriate electronic circuit.

In a typical piezoelectric-based self-powered device application such as in the present laser activated initiation devices, a piezoelectric electrical energy generator similar to the one shown in FIG. 1 is used to provide electrical energy (charges) that is used to power the device to perform its described function, in the present case detection of the prescribed acceleration pulse event (all-fire condition for the case of munitions) with false trigger protection and arming (enabling) the laser activated initiation device initiation of the provided pyrotechnic material. In the present case, the piezoelectric electrical energy generator is intended to generate electrical energy because of acceleration pulses events (i.e., shock loading events). The piezoelectric electrical energy generator 10 is thereby functioning as a so-called energy harvester to convert mechanical energy to electrical energy to power the self-powered component of the present laser activated initiation devices.

It is appreciated by those skilled in the art that the shock loading pulse due to the applied acceleration pulse that is applied to the piezoelectric element 11 of the piezoelectric electrical energy generator 10 may also be similarly applied by direct application of a compressive force shown by the arrow 16 in FIG. 1. The applied compressive force may be the result of impact with an object, a pressure wave, or the like.

Figure 2:
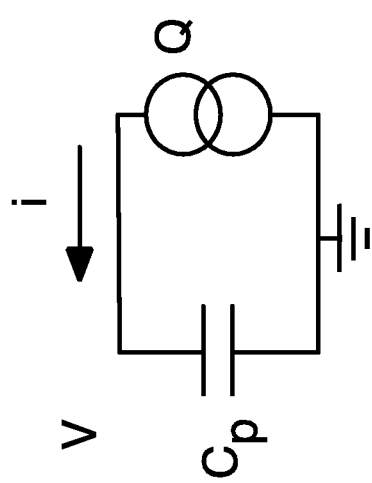
FIG. 2 illustrates a model of a piezoelectric element of the generator of FIG. 1.

A stand-alone piezoelectric (usually in stack form) element can be modeled as a capacitor $C_p$ connected in parallel to a charge source Q as shown in FIG. 2. The charge source Q generates charge proportional to the axial (normal) strain of the piezoelectric element as it is subjected to axial (normal) loading, and thereby sends the charge as current i to the capacitor $C_p$ of the piezoelectric element. The charges accumulated on the capacitor $C_p$ produces a voltage V, which is the so-called open-circuit voltage of the piezoelectric element. When the piezoelectric element is connected to another circuitry, the generated charge and current are the same, but due to the resulting charge exchange with the other circuitry, the in circuit voltage of the piezoelectric element may be different from the open circuit voltage V.

Two typical plot A and B of the profile of the open-circuit charge level on the piezoelectric element (FIG. 2) as it is subjected to a short duration acceleration pulse such as munitions firing or impact loading as a function of time are shown in FIG. 3. The maximum amount of charges Q (in Coulomb) is dependent on the size of the piezoelectric element and the applied impact force levels. In most cases of interest, the acceleration pulse may be from tens of microseconds to several milliseconds in duration.

As was indicated previously, the present laser activated initiation devices preferably use the integrated circuit (IC) disclosed in the aforementioned U.S. Provisional Patent Application Nos. 62/367,075, Filed on Jul. 26, 2016 and 62/510,179, filed on May 23, 2017, and require very few discrete electronic components to "program" the arming circuit to detect a prescribed acceleration pulse and to be configured to perform the pyrotechnic initiation by the activating laser beam with or without a time delay. Below, the design and operation of the integrated circuit (IC) with the external components that are used to detect the prescribed acceleration pulse (all-fire condition in munitions), i.e., an acceleration pulse that is higher than a minimum prescribed magnitude and which has a duration longer than a minimum prescribed duration at or above the minimum acceleration magnitude.

Figure 4:
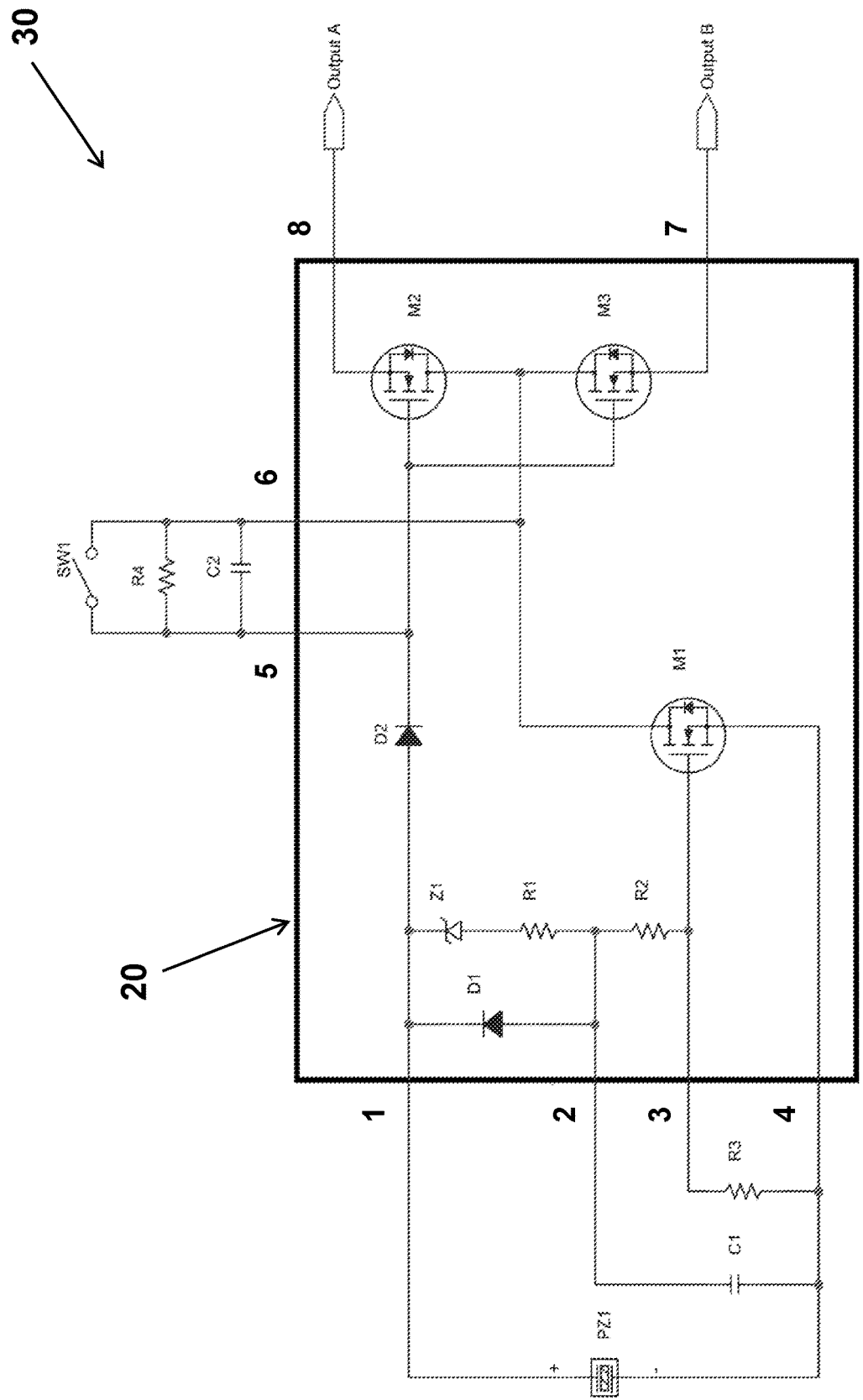
FIG. 4 illustrates the schematic of the integrated circuit (IC) for a piezoelectric-based self-powered circuit to detect a prescribed acceleration pulse with false trigger protection capability, a so-called "inertial switch", used to construct the arming (enabling) circuit (mechanism) of the disclosed laser activated initiation device embodiments.

The schematic of the integrated circuit (IC) 20 to be used is shown in FIG. 4, as indicated by the solid rectangular box. The integrated circuit 20 may be fabricated using MOS technology or the like. Here, the basic design and the function performed by the integrated circuit (IC) 20 are described as used in the construction of the self-powered acceleration pulse event detection device with false trigger protection logic and resetting capability, indicated by the numeral 30. In the disclosed laser activated initiation devices, the acceleration pulse event detection capability of the device 30 is used to construct their arming (enabling) capability, as will be described later in detail.

The acceleration event detection device 30, also known as a self-powered "inertial switch", is constructed to detect acceleration pulses that are longer in duration and higher in amplitude than certain prescribed levels, such as those experienced during munitions firing or target impact, or impacts during a vehicles accident, or the like. In the schematic of FIG. 4, the setting (programming) of the prescribed acceleration pulse magnitude and duration thresholds are shown to be accomplished by the choice of the resistance of the resistor R3 and the capacitance of the capacitor C1, both external to the integrated circuit (IC) embodiment 20 as is described later in this disclosure.

Figure 5:
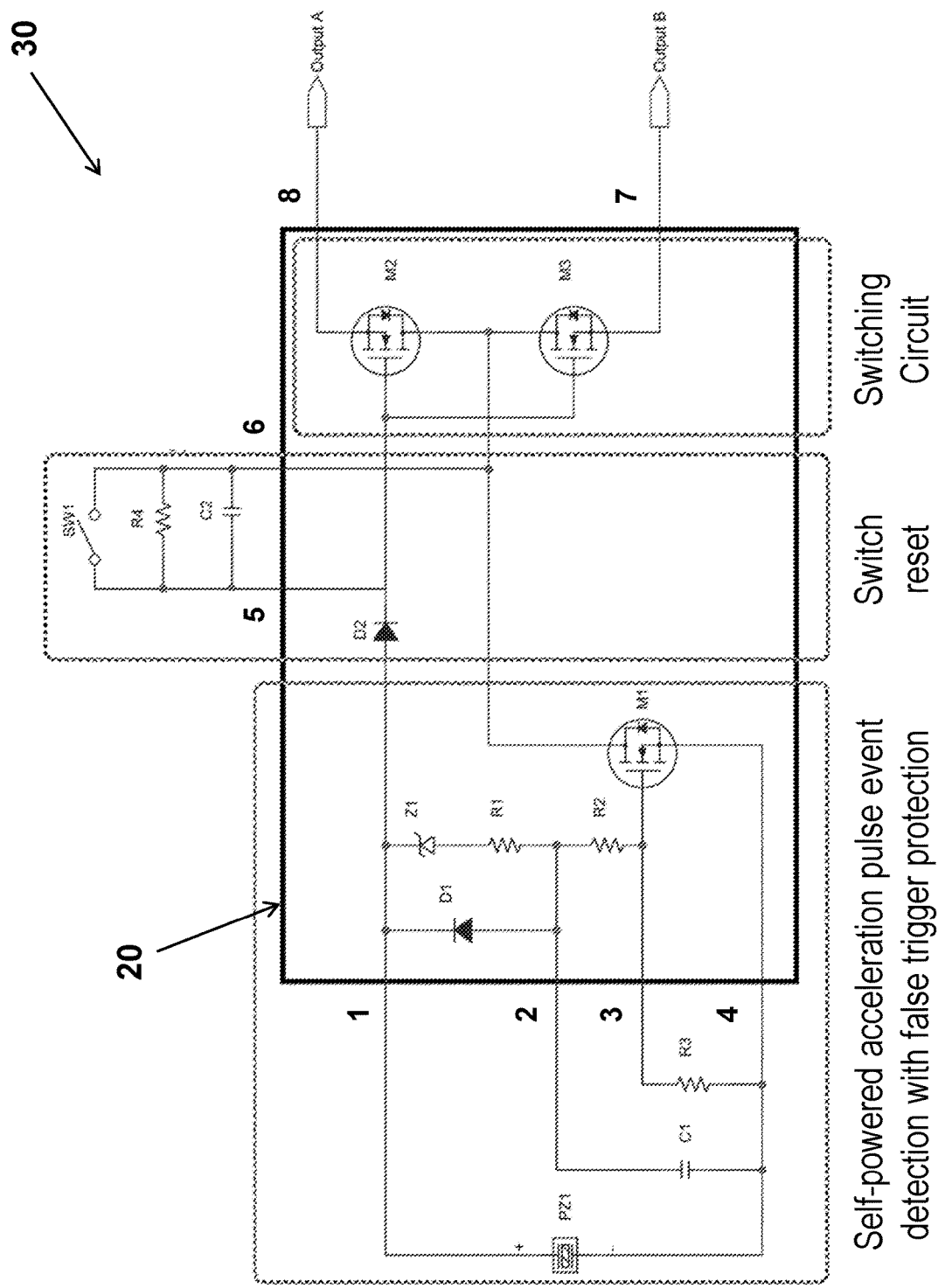
FIG. 5 illustrates the schematic of FIG. 4 with the primary functions of the components of the self-powered acceleration pulse event detection device with false trigger protection logic and resetting capability indicated by blocks drawn with dotted lines.

The integrated circuit IC 20 based "self-powered acceleration pulse event detection device with false trigger protection logic and resetting capability" 30 of FIG. 4, is redrawn in FIG. 5 to describe the functionality of its various components.

The primary functions performed by the components of the inertial switch 30 of FIG. 4 may presented by the three function blocks shown with dotted lines in FIG. 5. As can be seen in FIG. 5, the three function blocks are the "Self-powered acceleration pulse event detection with false trigger protection" block; the "Switch reset"; and the "Switching circuit".

When the piezoelectric element PZ1 of the inertial switch 30, which may be as shown in FIG. 1, is subjected to an acceleration pulse, such as an acceleration in the direction of the arrow 14 in FIG. 1, the piezoelectric element will generate an open-circuit charge profile such as the ones shown in FIG. 3. The generated charges will then begin to charge the capacitor C1.

The inertial switch 30 is designed to be capable of differentiating a prescribed acceleration pulse events as described by a minimum acceleration pulse magnitude and a minimum of its duration (the so-called all-fire events for the case of gun-fired munitions and mortars) from other acceleration events that may occur during manufacture, assembly, handling, transport, accidental drops, etc. The event is hereinafter referred to as the "prescribed acceleration pulse event". To detect the occurrence of a prescribed acceleration pulse event, the profile of the charge voltage generated by the piezoelectric element PZ1 of the inertial switch 30 must satisfy the event minimum magnitude and its minimum duration (at the minimum magnitude) conditions. In the inertial switch 30 of FIG. 5, the magnitude and duration thresholds are configured by the resistance of the resistor R3 and the capacitance of the capacitor C1, both of which are external components to the integrated circuit embodiment 20.

The aforementioned magnitude threshold of the open-circuit piezoelectric charge voltage, which is proportional to the magnitude of the acceleration pulse experienced by the piezoelectric element and its duration is determined from the voltage of the capacitor C1. It is appreciated by those skilled in the art that under relatively low acceleration levels, such as those experienced during transportation induced vibration, the voltage across the piezoelectric element PZ1 is lower than the Z1 Zener diode voltage and since the diode D1 also blocks the current flow into the capacitor C1, the capacitor C1 stays discharged. In the integrated circuit 20, the Zener diode Z1 is generally used to set a minimum voltage threshold level for blocking charging of the capacitor C1 by charges generated by the piezoelectric element in response to the aforementioned low acceleration levels such as those due to transportation induced accelerations. At such low acceleration levels, no current will pass through the resistor R1 to charge the capacitor C1, and the MOSFET M1 is in cut-off mode and no current passes to the output ports. In general, the capacitance of the capacitor C1 is selected to be very low and the resistance of the resistor R1 is selected to be high so that a very small portion of the electrical energy generated by the piezoelectric element PZ1 is consumed by the Z1, R1 and C1 circuit.

In the inertial switch 30 of FIG. 5, the resistors R1 and R2 of the integrated circuit 20 are fixed and by selecting appropriate values for the resistance of the resistor R3 and the capacitance of the capacitor C1, the user sets the aforementioned acceleration pulse magnitude and duration thresholds for the inertial switch 30. In the integrated circuit 20. The MOSFET M1 functions as a signal switch, which is activated when its gate voltage level has been reached.

When the inertial switch 30 of FIG. 5 experiences an acceleration pulse, if the voltage of the charges generated by the piezoelectric element PZ1 passes the Z1 Zener diode voltage, the reverse biased Z1 diode passes current to the capacitor C1, and the capacitor begins to be charged. If the acceleration pulse amplitude passes the prescribed threshold level and lasts longer than the prescribed duration threshold, the gate voltage of the MOSFET M1 will be reached and it is activated. However, if the amplitude of the acceleration pulse is higher than the prescribed threshold level but its duration is below that of the prescribed duration threshold, then the gate voltage of the MOSFET M1 will not be reached, and it is not activated.

Once a prescribed acceleration pulse event has been detected by the detection of aforementioned minimum magnitude and its minimum duration (at the minimum magnitude), the MOSFET M1 is activated as is described above. Upon activation of the MOSFET M1, the capacitor C2 is charged up to a voltage level which is higher than the gate threshold voltage of the MOSFETs M2 and M3, and would allow current to flow in both directions. As a result, the normally open circuit between the integrated circuit (IC) 20 pins 7 and 8 is closed. The inertial switch 30 of FIG. 5 is thereby functions as a normally open inertial switch, which closes the circuit (between the pins 7 and 8) upon detection of the prescribed acceleration pulse event.

As can be seen in FIG. 5, the components of the "switch reset" function block, i.e., the normally open switch SW1, the capacitor C2 and the resistor R4 are external to the integrated circuit (IC) 20. In the inertial switch 30, the user has the option of providing the resistor R4 and/or the normally open switch SW1. Without the resistor R4, the charges stored in the capacitor C2 will slowly drain due to unavoidable leakages in the various components of the inertial switch circuitry and once the voltage of the capacitor C2 drops below the gate threshold voltage of the MOSFETs M2 and M3, the closed circuit between the pins 7 and 8 is opened. This option of the inertial switch 30 is in effect a normally open inertial switch with latching capability. However, unlike mechanical switches or externally powered switches, the latching state is not permanent. However, for many applications such as in munitions and in other similar cases in which as a result of detection of the prescribed acceleration pulse a system is supposed to react and perform certain action, the present normally open inertial switch is in effect a latching switch.

The user may also choose to provide the resistor R4, FIG. 5. The function of the resistor R4 is to slowly drain the charges in the capacitor C2. By choosing lower resistance for the resistor R2, the rate at which the capacitor C2 charges are drained is increased, therefore the inertial switch remains closed, i.e., the circuit between the pins 7 and 8 remains closed for a shorter period of time.

In some applications, such as during engineering development of devices and systems that are expected to be subjected to acceleration pulses, the user may want to be able to reset the inertial switch state, i.e., to drain the charges in the capacitor C2 to open the circuit between the pins 7 and 8. In such application, a manual or certain control system activated normally open switch SW1, FIG. 5, may be provided to serve as a reset switch. The use would then close the switch SW1 when desired, to drain charges in the capacitor C2 to open the circuit between the pins 7 and 8.

Figure 6:
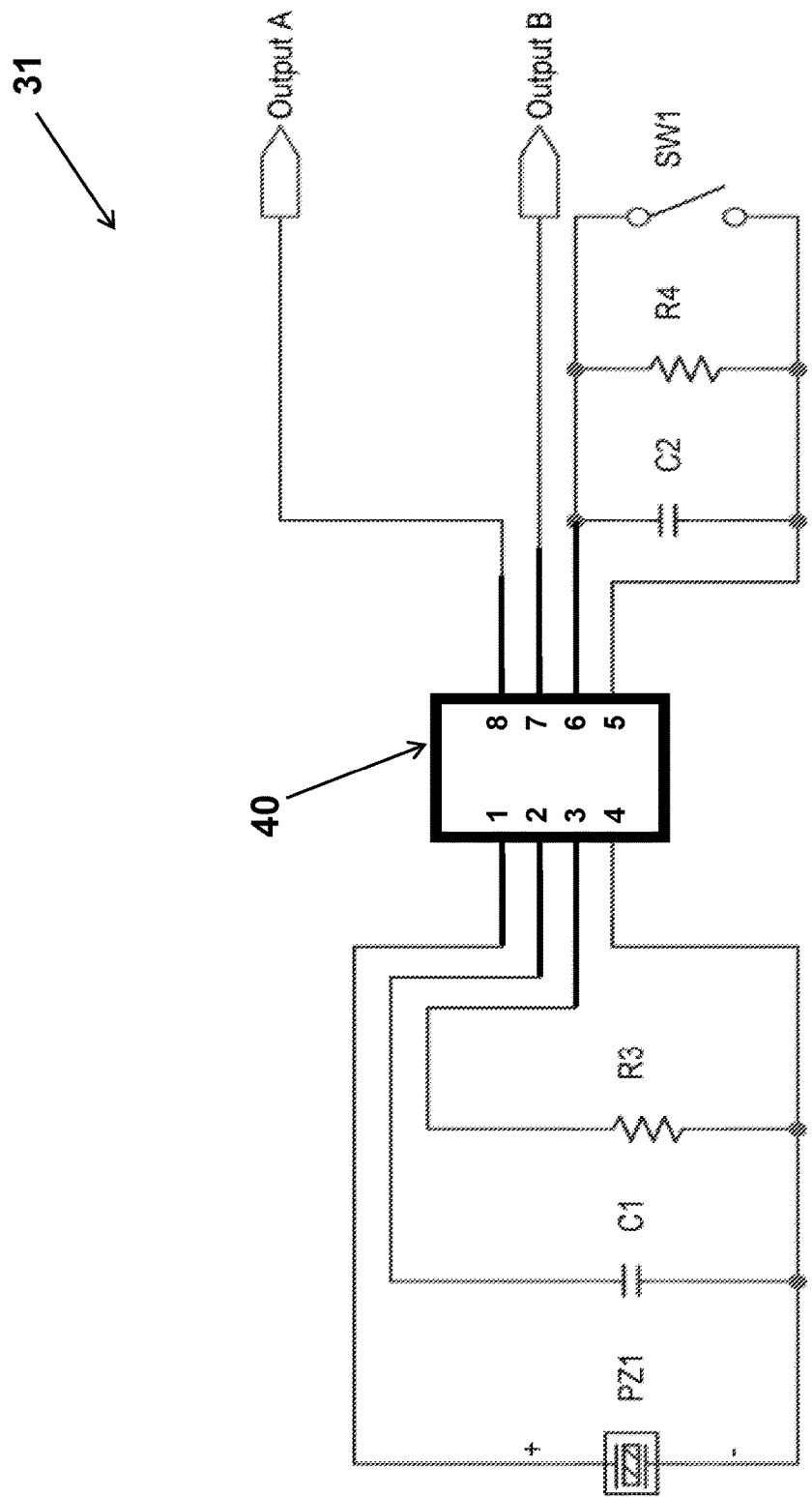
FIG. 6 illustrates the inertial switch embodiment of FIG. 5, as to be fabricated using the integrated circuit (IC) embodiment by the addition of external components.

FIG. 6 shows the inertial switch 30 of FIG. 5, as it would be fabricated using the integrated circuit 20 by the addition of the aforementioned external components. The integrated circuit 20 (indicated by the numeral 40 in FIG. 6) is shown with the 8 pins, as numbered in the schematics of FIGS. 4 and 5, for connecting the external components of the inertial switch (indicated by the numeral 31 in FIG. 6).

It is appreciated that 8 pins are the minimum number of pins that are required on the integrated circuit (IC) 40 of FIG. 6 (20 of FIGS. 4 and 5) for the present inertial switch construction. The integrated circuit may, however, be fabricated with additional pins for connecting other components to modify the values of, for examples, resistances of the IC resistors, or change the gate voltage of the MOSFETS, or directly add other external components to provide certain other functionality for the intended application.

Figure 7:
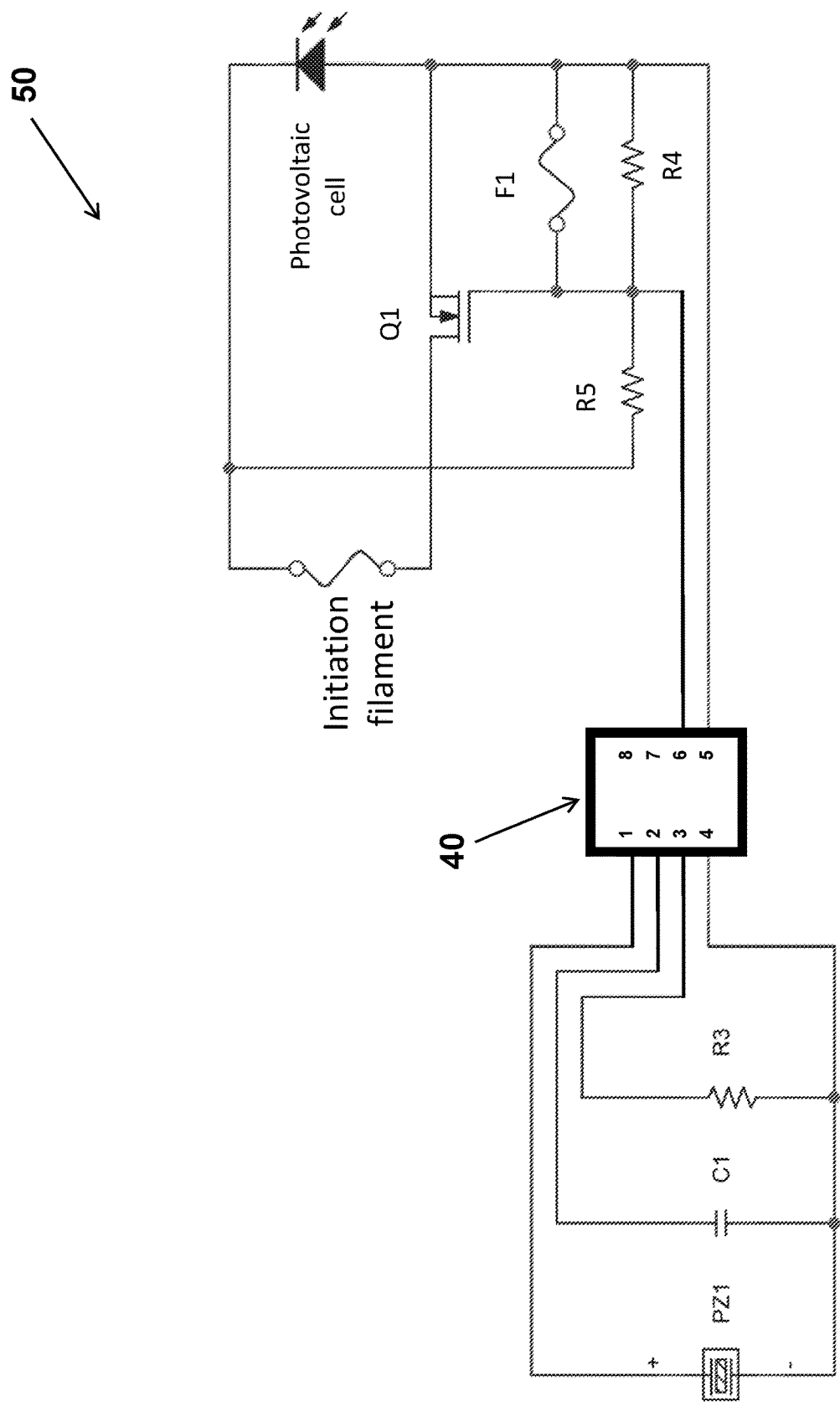
FIG. 7 illustrates the schematic of the first embodiment of laser activated initiation device.

FIG. 7 illustrates the first embodiment 50 of the present laser activated initiation device. The device is shown to use the integrated circuit (IC) 40 of FIG. 6 (20 in FIGS. 4 and 5) to construct its arming (enabling) capability. In this embodiment, this is accomplished by configuring the piezoelectric-based self-powered acceleration pulse magnitude and duration detection capability (the so-called all-fire detection capability in munitions) with its false trigger protection logic (the so-called no-fire protection/safety capability in munitions) to act as a switch by burning a fuse wire and opening a circuit, thereby permanently changing the laser activated initiation device circuit state as described later in this disclosure. In the laser activated initiation device embodiment 50, this switching action constitutes the arming (enabling) mechanism, upon which the user can activate the initiation device using a laser beam.

In describing the operation of the "inertial switch" of FIGS. 4, 5 and 6, it was shown that when the aforementioned prescribed acceleration pulse event has been detected by the detection of the prescribed minimum magnitude and minimum duration at the minimum magnitude, then the MOSFET M1 is activated as it was described above. Upon activation of the MOSFET M1, the remaining charges that are generated by the piezoelectric element PZA is routed to charge the capacitor C2, which is connected to the pins indicated as 5 and 6 in the integrated circuit (IC) 40 (20 in FIGS. 4 and 5).

In the first embodiment 50 of the present laser activated initiation device shown in FIG. 7, the circuit to the right of the integrated circuit (IC) 40 is attached to the pins 5 and 6 as shown in FIG. 7. Thus, once the aforementioned prescribed acceleration pulse event (all-fire event in munitions) has been detected by the detection of the prescribed minimum magnitude and minimum duration at the minimum magnitude and the MOSFET M1 is activated, then the remaining charges that are generated by the piezoelectric element PZA is routed through the fuse F1 shown in FIG. 7. In this circuit, the resistance of the resistor R4 is selected to be high and the resistance of the fuse F1 is selected to be very low (preferably in the order of 1-3 Ohms), therefore almost all the generated current by the activation of the MOSFET M1 is passed through the fuse F1 and causes it burn, thereby opening the indicated circuit parallel to the resistor R4.

It is appreciated by those skilled in the art that in the provided laser activated initiation device circuit connected to the pins 5 and 6, the transistor Q1 acts as a normally open switch. If MOSFET M1 inside the integrated circuit (IC) 40 is not activated, i.e., if the laser activated initiation device 50 has not detected the aforementioned prescribed acceleration pulse, since the fuse F1 is intact, the drain and source pin of the transistor Q1 are shorted by the fuse F1, causing the transistor Q1 to remain in cut off mode, i.e., act as an open switch. During this state of the transistor Q1, any current that may be generated by the photovoltaic cell cannot activate the transistor Q1. With the intact fuse F1, any current generated by the photovoltaic cell passes almost entirely through the resistor through resistor R5 since the resistance of the resistor is very high and that of the fuse F1 is very low, in effect the fuse F1 is shorting the resistor R4. Therefore, the negligible amount of current passing through the fuse F1 cannot burn its filament and therefore the transistor Q1 still act as an open switch. As a result, any current generated by the photovoltaic cell would not pass through the initiation "filament", FIG. 7. That is, as long as the laser activated initiation device 50, FIG. 7, is not armed (enabled) by the aforementioned detection of the prescribed acceleration pulse (the all-fire condition in munitions) and consequent burning of the fuse F1 filament, the device 50 is in its disarmed (not enabled) state.

As an example, consider the case in which the photovoltaic cell is producing a voltage of 5 V. If the resistance of the resistors R4 and R5 are 5 MΩ and the resistance of the fuse F1 is 3Ω, then the current passing through the fuse F1 will be around 1 µA, which the fuse F1 is designed to readily withstand.

It is also appreciated by those skilled in the art that once the aforementioned prescribed acceleration pulse event (all-fire event in munitions) has been detected by the detection of the prescribed minimum magnitude and minimum duration at the minimum magnitude and the MOSFET M1 is activated, the remaining charges that are generated by the piezoelectric element PZA is routed through the fuse F1 shown in FIG. 7, and as was previously described will burn the filament of the fuse F1. At this point, the embodiment 50 of the present laser activated initiation device shown in FIG. 7 is armed (enabled). At this point, the drain and source pins of transistor Q1 are no longer shorted by the fuse F1.

Now when current is generated by the photovoltaic cell by the user laser beam (light source), voltage drop across the resistors R4 and R5 causes the transistor Q1 to be activated. Once the transistor Q1 is activated, the previously open "switch" Q1 is closed, and since the resistances of the resistors R4 and R5 are high, almost all the generated current is passed through low resistance "initiation filament", FIG. 7. The initiation filament is thereby heated, and if the components of the laser activated initiation device 50, FIG. 7, have been selected properly to match the ignition temperature of the pyrotechnic material being used, the heated initiation filament would ignite the adjacent pyrotechnic material.

In the laser activated initiation device 50, FIG. 7, the photovoltaic cell may be any photosensitive cell such as a photodiode or a photovoltaic or an array of such cells, such as the photovoltaic cell with part number CPC1822 by IXYS Corporation. The light source for the photovoltaic cell may be a high power LED or a laser diode such as part number SLD3234VF by Sony Corporation. In general, when higher currents are needed, more than one photovoltaic cell and light source may be used, and the photovoltaic cells are connected together in parallel configuration.

In the laser activated initiation device embodiment 50 of FIG. 7, the current generated by the photovoltaic cell is directly used to heat the initiation filament to ignite the provided pyrotechnic material. Thus, the photoelectric cell must provide enough current to heat the initiation filament rapidly enough to raise its temperature to the required level that would ignite the pyrotechnic material being used, noting that the heat generated by the initiation filament would also be conducted away, particularly at low temperatures. This is particularly problematic in munitions applications since munitions may also be used at very low temperatures, sometimes even less than −60 degrees C. This would make the required current level highly dependent on the temperature and to ensure initiation at very low temperatures, the laser activated initiation device embodiment 50 must be provided with one or more photovoltaic cells that are illuminated with relatively strong laser/light sources to generate the required current levels. In addition, the initiation process will take a relatively long time, which is also dependent on the ambient temperature of the initiation filament and the heat conductivity and heat capacity of the pyrotechnic material and other surrounding material.

Figure 8:
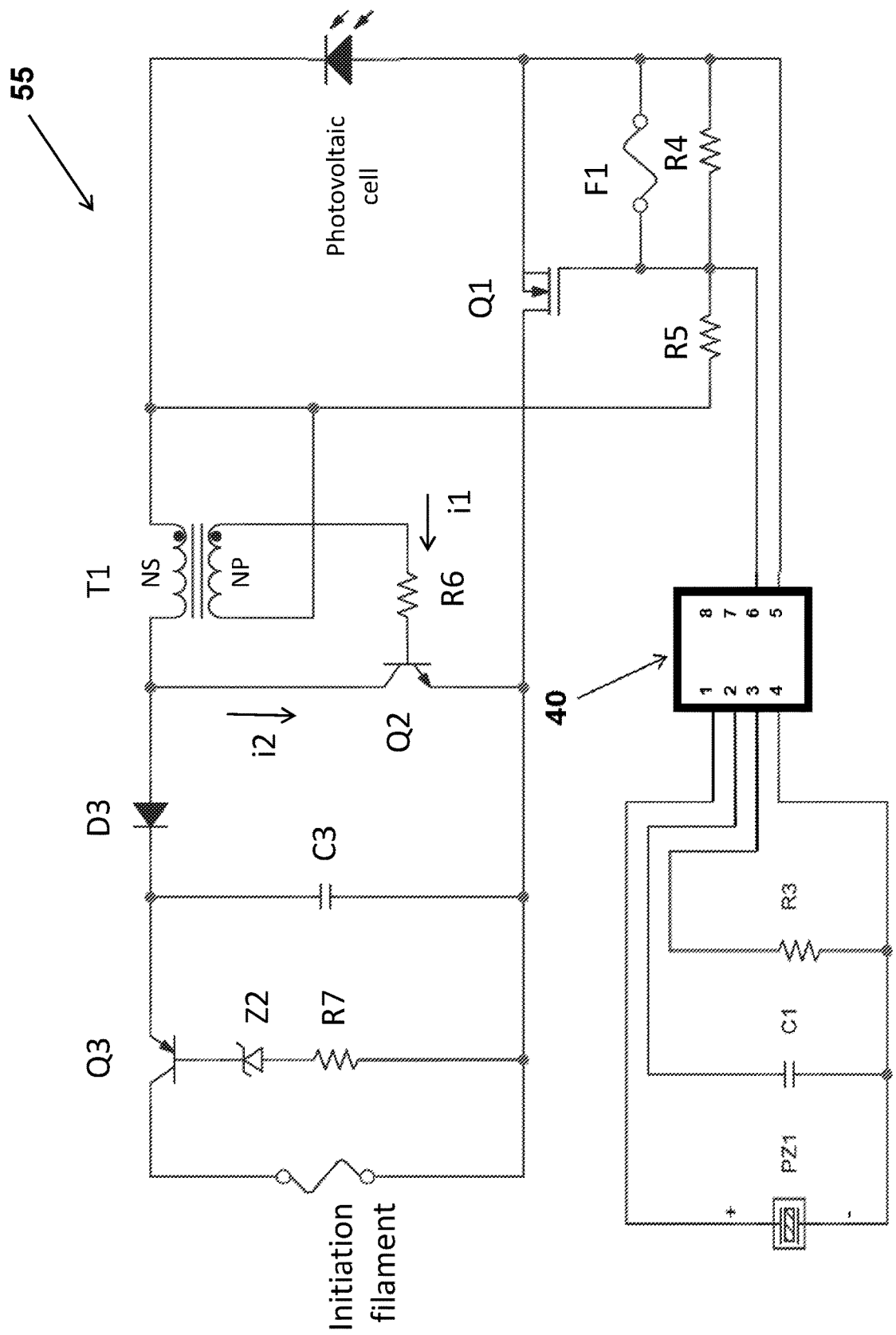
FIG. 8 illustrates the schematic of the second embodiment of laser activated initiation device.

The second embodiment 55 of the laser activated initiation device shown in FIG. 8 is intended to provide very fast initiation filament heating to minimize the effect of its aforementioned surrounding temperature, and not to require strong current generation from the photovoltaic cell of the device. In addition, an LED light is also provided to alert the user of the initiation filament heating. In the embodiment 55 of the laser activated initiation device shown in FIG. 8, a sufficient amount of electrical energy is first generated by the photovoltaic cell and stored in a storage capacitor, and is then used to suddenly pass a very high current through the very low resistance (usually 1-3 Ohm) initiation filament. The initiation filament is thereby heated during a very short period of time, and considering the natural relatively long time constant of heat conduction into the surrounding regions, the temperature of the initiation filament is rapidly raised to ignite the surrounding pyrotechnic material.

It is appreciated by those skilled in the art that the level of current that the storage capacitor can discharge through the initiation filament is proportional to its voltage, and that photovoltaic cells can only generate voltages of a few volts. Thus, a circuitry such as a voltage booster must be used to step up the photovoltaic generated voltage to charge the electrical energy storage capacitor for discharge at high voltage, i.e., at high current, through the initiation filament for the aforementioned desired rapid heating.

In the embodiment 55 of FIG. 8, the capacitor C3 is the intended high voltage electrical energy storage capacitor that is to be charged by the electrical energy generating photovoltaic cell through the aforementioned voltage booster after the laser activated initiation device embodiment 55 is armed (enabled), i.e., after the transistor Q1 is activated as was described for the laser activated initiation device embodiment 50 of FIG. 7 following detection of the prescribed acceleration pulse of minimum magnitude that lasts a minimum period of time.

As the energy stored in a capacitor is proportional to the square of its voltage, a typical capacitor C3 will be rated at higher voltage than supplied by the photovoltaic cell, which is usually of the order of a few volts. Thus, direct charging of C3 is not practical. To achieve the higher required voltage across the capacitor C3, the aforementioned voltage booster circuit comprising of a transistor Q2 and coupled inductors NP and NS provides a practical solution as shown in FIG. 8. These coupled inductors are usually provided by a transformer T1 shown in the circuit of FIG. 8. The circuit configuration of the two inductors NP and NS and the transistor Q2 form an oscillator which progressively charges the capacitor C3.

The operation of the voltage booster circuit of the laser activated initiation device embodiment 55 is based on positive feedback provided by the proportional relationship between the transistor Q2 base current i1 and the collector current i2, FIG. 8. At the beginning of the charging cycle, that is when the photovoltaic cell is illuminated, the base current i1 and therefore the collector current i2 are zero and begin to increase in response to the photo-generated voltage. The collector current i2 increases at a rate which may be a factor of 200 times greater than the base current i1, due to the current gain of the transistor. In this manner, increasing collector current causes increase in the collector-emitter voltage, which results in an increase in the base current, which in turn increases the collector current, resulting in positive feedback. The process continues until the collector current reaches its maximum value, at which point the transistor Q2 is in its saturated state, and the voltage the across the inductors goes to zero, and as a result the base current i1 goes to zero, and the transistor Q2 switches off, resulting in zero collector current i2. The charged inductor NS now reverses polarity and the energy from NS is dumped into the capacitor C3 as the diode D3 which was previously reverse biased now becomes forward biased. Once the transistor Q2 base current i1 goes to zero, the cycle repeats as photovoltaic cell is still illuminated. The voltage across the capacitor C3 builds up in this step-wise manner until the voltage across the capacitor C3 reaches a level above the breakdown voltage of the Zener diode Z2, at which point the transistor Q3 switches into the ON state allowing current to flow through the initiation filament. The initiation filament is thereby heated very rapidly, allowing it to initiate (ignite) the provided pyrotechnic material. The current flow through the initiation filament will go to zero either if the initiation filament is burned or the capacitor voltage across C3 falls below the Zener diode breakdown voltage.

Figure 9:
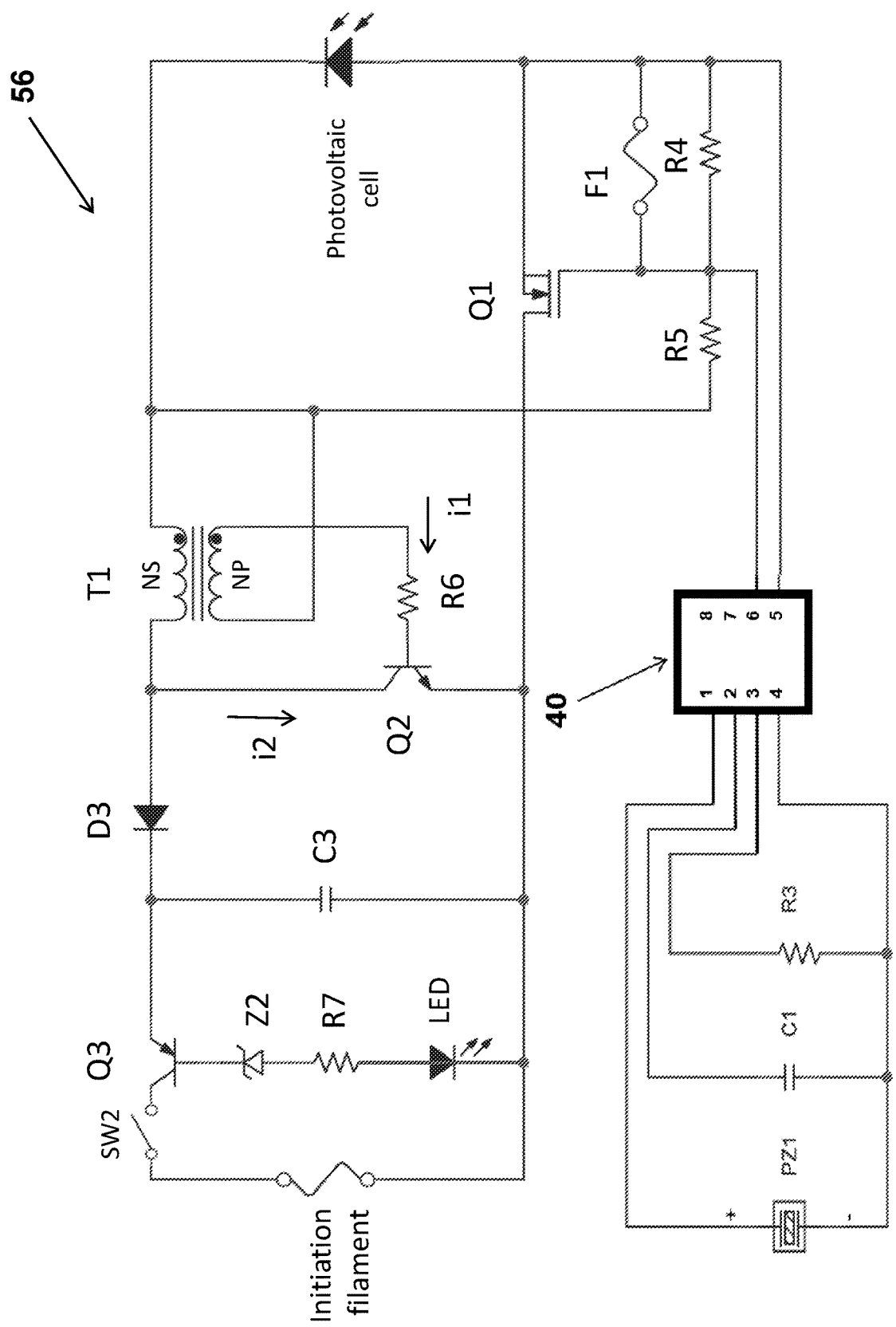
FIG. 9 illustrates the schematic of the third embodiment of laser activated initiation device.

The third embodiment 56 of the laser activated initiation device shown in FIG. 9. This embodiment is identical to the embodiment 55 of FIG. 8, except that it is also provided with a normally open switch SW2 between the transistor Q3 and the initiation filament and an LED light as can be seen in FIG. 9. In this embodiment, as the electrical energy storage capacitor C3 is charged to the expected voltage, the indicated LED light goes on, indicating that the capacitor C3 is charged with enough electrical energy. The user can then close the switch SW2, thereby discharging the capacitor C3 through the initiation filament. The initiation filament is thereby heated very rapidly, allowing it to initiate (ignite) the provided pyrotechnic material.

Figure 10:
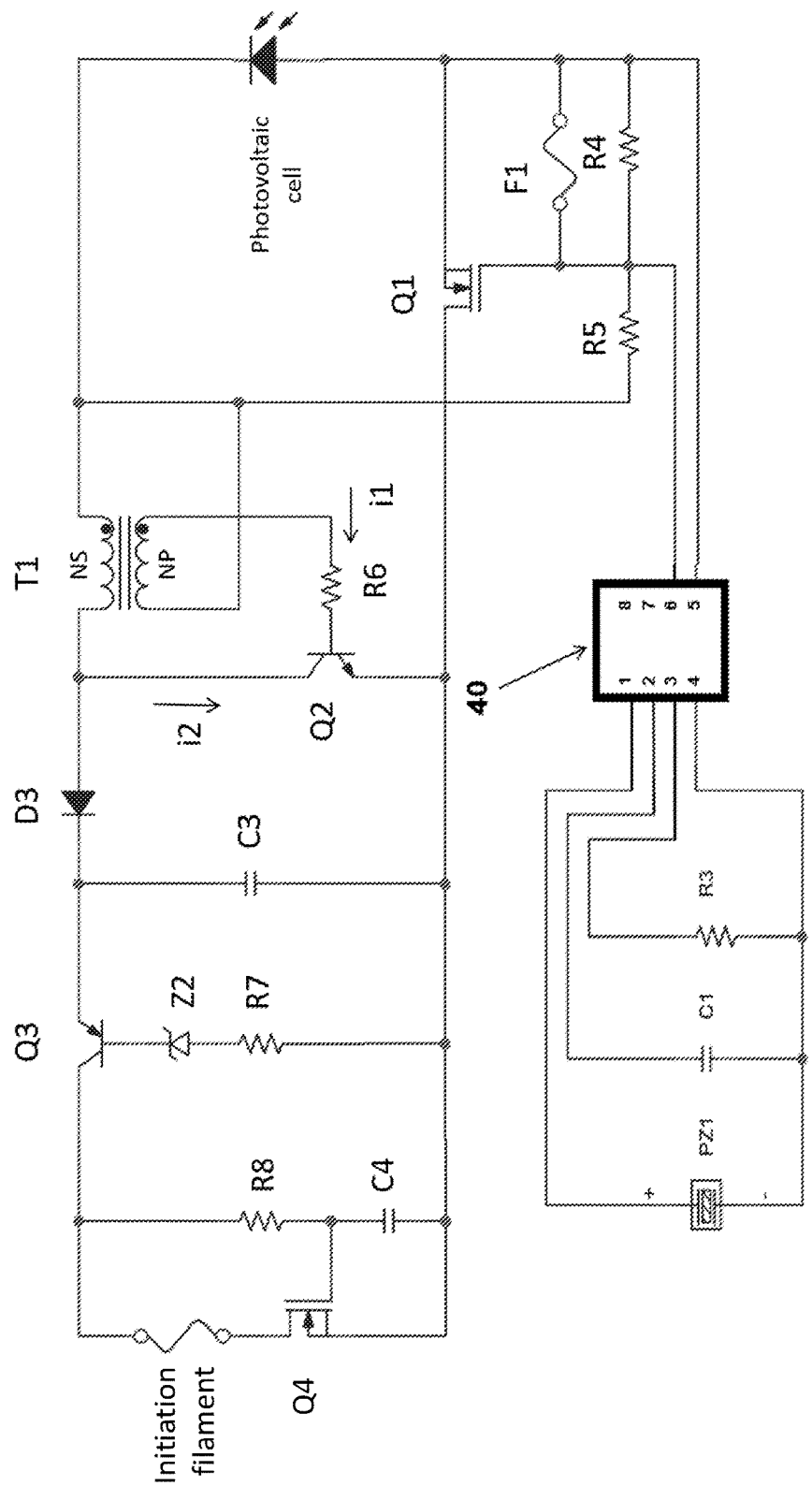
FIG. 10 illustrates the schematic of the fourth embodiment of laser activated initiation device.

The fourth embodiment 57 of the laser activated initiation device shown in FIG. 10. This embodiment is identical to the embodiment 55 of FIG. 8, except that a timing circuit is also provided that would delay the discharge of the electrical energy from the capacitor C3 through the initiation filament once the voltage of the capacitor has reached its prescribed level. In the modified circuit of FIG. 10, once the voltage across the capacitor C3 is larger than the Zener voltage of Z2, the transistor Q3 is activated and current begins to flow into the capacitor C4 through the resistor R8. The transistor Q4 is a MOSFET which acts as a switch. The transistor Q4 is initially open and it is closed when the capacitor C4 is charged to a voltage equal or larger than Q4 gate threshold voltage. The capacitance of C4 is significantly smaller than that of the capacitance of the capacitor C3 so that minimal electrical energy is discharged into the capacitor C4 from the capacitor C3. The transistor Q4, resistor R8 and the capacitor C4 together form a timer. The amount of time that it takes for the voltage across the capacitor C4 to reach the transistor Q4 gate threshold voltage level is determined by the time constant of the resistor R8 and capacitor C4. By properly selecting the resistance of the resistor R8 and the capacitance of the capacitor C4, the amount of time that it takes for the transistor Q4 to be activated following activation of the transistor Q3 can be set to the desired value.

Once the capacitor C4 is charged to transistor Q4 gate threshold voltage, the transistor Q4 is activated and current flows from the capacitor C3 through into the initiation filament. The initiation filament is thereby heated very rapidly, allowing it to initiate (ignite) the provided pyrotechnic material.

Figure 11:
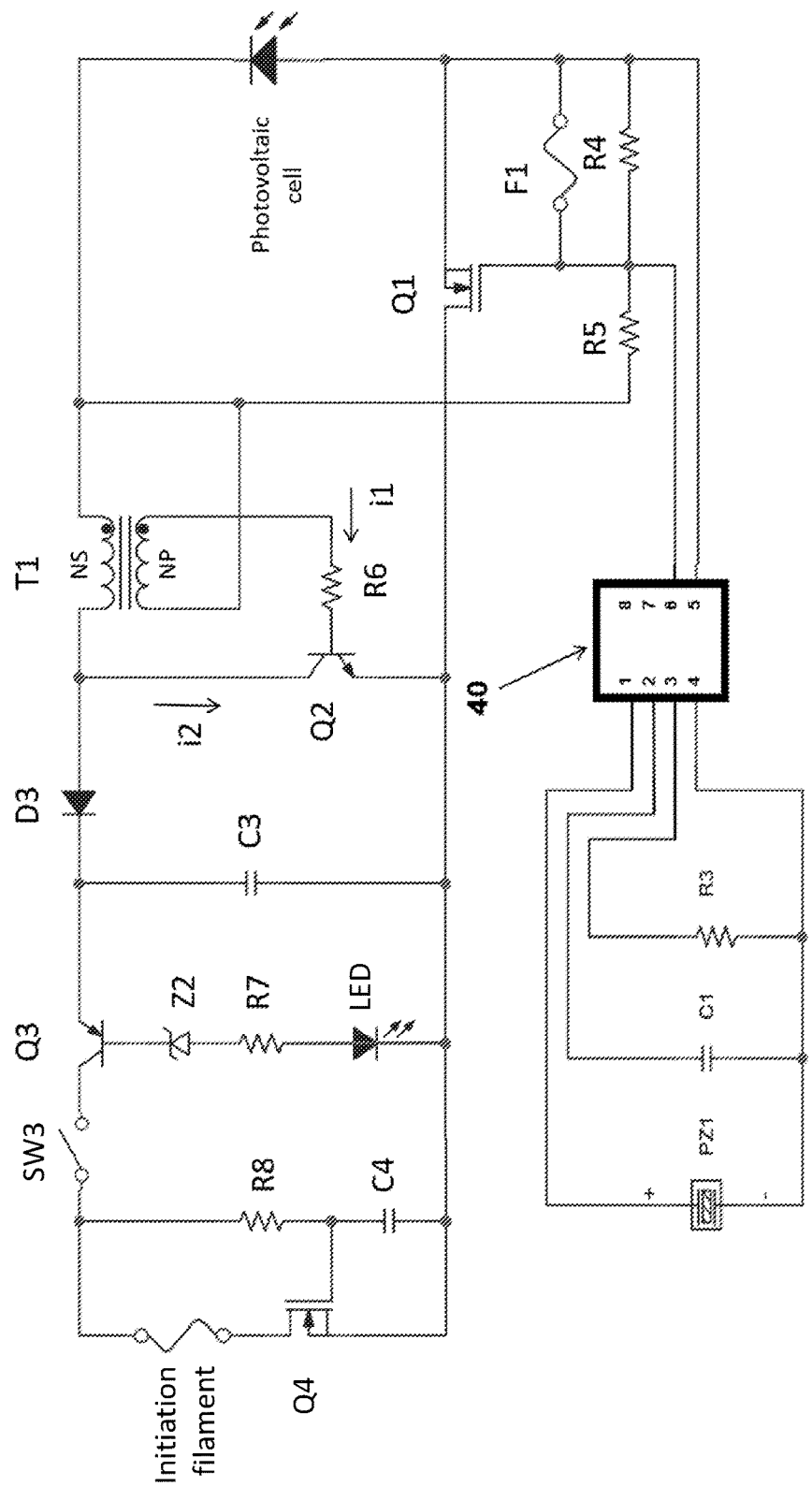
FIG. 11 illustrates the schematic of the fifth embodiment of laser activated initiation device.

The fifth embodiment 58 of the laser activated initiation device shown in FIG. 11. This embodiment is identical to the embodiment 57 of FIG. 10, except that it is also provided with a normally open switch SW3 between the transistor Q3 and the initiation filament and an LED light as can be seen in FIG. 11. In this embodiment, as the electrical energy storage capacitor C3 is charged to the expected voltage, the indicated LED light goes on, indicating that the capacitor C3 is charged with enough electrical energy. The user can then close the switch SW2, thereby discharging the capacitor C3 through the initiation filament. The initiation filament is thereby heated very rapidly, allowing it to initiate (ignite) the provided pyrotechnic material.

It is appreciated by those skilled in the art that different types of photovoltaic cells are currently available and that any one of such cells, which could be eliminated by an appropriate light source such as a high power LED or a diode laser, or the like may be used in the disclosed embodiments of FIGS. 7-11. Similarly, photodiodes or other similar cells, well known in the art, may be used in place of the indicated photovoltaic cells.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An electrically initiated inertial switch for detecting an acceleration and a duration of the acceleration for producing a signal when a prescribed acceleration and a prescribed duration of the acceleration occurs, the inertial switch comprising:

a first pin configured to receive a voltage over a duration from an electrical energy generating device that is responsive to an acceleration of the inertial switch;

second and third pins configured to together set a threshold acceleration and a threshold duration of the acceleration of the inertial switch; and fourth and fifth pins configured to produce an indication when the threshold acceleration and the threshold duration of the acceleration of the inertial switch has occurred.

2. The inertial switch of claim 1, comprising a Zener diode, wherein the first and second pins are coupled together through the Zener diode to ensure that at least a minimum voltage threshold level occurs prior to a start of the prescribed duration.

3. The inertial switch of claim 2, comprising first and second resistors, wherein the first resistor couples the first and second pins together through the Zener diode and the second resistor couples the second and third pins together.

4. The inertial switch of claim 3, comprising a signal switch, wherein the switch control input is coupled to the third pin and the second resistor and is responsive to the inertial switch at least achieving the threshold acceleration and the threshold duration of the acceleration to produce the indication, and wherein the indication is a change in relative states between the fourth and fifth pins.

5. The inertial switch of claim 4, wherein the relative states between the fourth and fifth pins are conductive and non-conductive states between the fourth and fifth pins.

6. The inertial switch of claim 4, wherein the fourth and fifth pins operate as a normally-closed switch between the fourth and fifth pins.

7. The inertial switch of claim 4, wherein the fourth and fifth pins operate as a normally-open switch between the fourth and fifth pins.

8. The inertial switch of claim 4, comprising a bridge wire coupled to the fourth and fifth pins.

9. The inertial switch of claim 8, comprising pyrotechnic material positioned in proximity to the bridge wire wherein the bridge wire is configured to ignite the pyrotechnic material in response to the indication.

10. The inertial switch of claim 8, wherein the signal switch is a first switch and the bridge wire is a first bridge wire, the inertial switch further comprising:

a photovoltaic cell;

a second bridge wire; and a second switch coupled between the fourth pin and the second bridge wire, where the first bridge wire holds the second switch open and in response to the detection signal, the first bridge wire is configured to open and thereby close the second switch coupling the fourth pin to the second bridge wire.

11. The inertial switch of claim 10, comprising pyrotechnic material positioned in proximity to the second bridge wire wherein the second bridge wire is configured to ignite the pyrotechnic material in response to coupling the fourth pin to the second bridge wire.

12. The inertial switch of claim 10, comprising a light source configured to couple light to the photovoltaic cell.

13. The inertial switch of claim 12, wherein the light source comprises a plurality of light sources configured to couple light to the photovoltaic cell.

14. The inertial switch of claim 10, comprising a voltage booster circuit configured to boost the output voltage from the photovoltaic cell that is provided to the second bridge wire.

15. The inertial switch of claim 10, comprising:

an energy generating device coupled to the first pin;

a first energy storage device coupled to the second pin;

a resistive device coupled to the third pin; and a second energy storage device, wherein the second energy storage device is configured to be charged by the fourth pin to a threshold voltage, whereinafter the charge from the second energy storage device is coupled to the second bridge wire.

16. The inertial switch of claim 15, comprising a light configured to turn on when the second energy storage device reaches the threshold voltage.

17. The inertial switch of claim 10, comprising a voltage delay circuit configured to delay providing an output voltage from the closed second switch to the second bridge wire for a predetermined period of time.

18. The inertial switch of claim 17, comprising:

an energy generating device coupled to the first pin;

a first energy storage device coupled to the second pin;

a resistive device coupled to the third pin; and a second energy storage device, wherein the second energy storage device is configured to be charged by the fourth pin to a threshold voltage, whereinafter the voltage delay circuit is configured to delay providing the threshold voltage from the second energy storage device to the second bridge wire for a predetermined period of time.

19. The inertial switch of claim 1, wherein the inertial switch is a programmable electrically initiated inertial igniter.

20. The inertial switch of claim 1, wherein the inertial switch is a portion of an all-fire detection circuit for an electrically initiated inertial igniter.

21. The inertial switch of claim 1, wherein the inertial switch is configured as an integrated circuit.

22. The inertial switch of claim 1, wherein the indication is provided as an all-fire detection signal to an electrically initiated inertial igniter.

* * * * *